United States Patent
Ali et al.

(10) Patent No.: US 8,995,938 B2
(45) Date of Patent: Mar. 31, 2015

(54) RADIATION POWER LEVEL CONTROL SYSTEM AND METHOD FOR A WIRELESS COMMUNICATION DEVICE HAVING TUNABLE ELEMENTS

(75) Inventors: Shirook M. Ali, Waterloo (CA); Kelce Steven Wilson, Irving, TX (US); James Paul Warden, Irving, TX (US)

(73) Assignee: BlackBerry Limited, Waterloo (CA)

( * ) Notice: Subject to any disclaimer, the term of this patent is extended or adjusted under 35 U.S.C. 154(b) by 715 days.

(21) Appl. No.: 13/295,883

(22) Filed: Nov. 14, 2011

(65) Prior Publication Data

US 2013/0122827 A1     May 16, 2013

(51) Int. Cl.
*H01Q 11/12*     (2006.01)
*H04B 1/04*     (2006.01)
*H04W 52/36*     (2009.01)

(52) U.S. Cl.
CPC ........... *H04B 1/3838* (2013.01); *H04W 52/367* (2013.01)
USPC ....................................... 455/127.1; 455/522

(58) Field of Classification Search
USPC .................. 455/68, 69, 423, 425, 522, 550.1, 455/575.1, 575.2, 575.5, 575.7, 121, 123, 455/125, 127.1, 127.2, 127.4
See application file for complete search history.

(56) References Cited

U.S. PATENT DOCUMENTS

| | | | |
|---|---|---|---|
| 5,524,275 A | | 6/1996 | Lindell |
| 6,031,495 A * | | 2/2000 | Simmons et al. ............. 343/702 |
| 6,985,113 B2 | | 1/2006 | Nishimura |
| 7,146,139 B2 | | 12/2006 | Nevermann |
| 7,330,705 B2 * | | 2/2008 | Lee ................................ 455/117 |
| 7,609,171 B2 | | 10/2009 | Haapoja et al. |
| 7,610,027 B2 | | 10/2009 | Alapuranen |
| 7,847,741 B2 | | 12/2010 | Hirota |
| 8,483,632 B2 * | | 7/2013 | Asrani et al. ................... 455/117 |

(Continued)

FOREIGN PATENT DOCUMENTS

| | | |
|---|---|---|
| CA | 2746881 | 1/2012 |
| EP | 0827287 | 3/1998 |

(Continued)

OTHER PUBLICATIONS

CIPO, Office Action, Application No. 2,746,881, Jun. 7, 2013, 4 pgs.

(Continued)

*Primary Examiner* — Tuan A Tran
(74) *Attorney, Agent, or Firm* — The Danamraj Law Group, P.C.

(57) ABSTRACT

A radiation power level compliance and control scheme for a wireless user equipment (UE) device including one or more tunable elements. The wireless UE device comprises a component configured to detect one or more changes with respect to at least one operational parameter associated with the wireless UE device. A component is provided for determining that a tunable action is required with respect to at least one of the tunable elements. Upon defining one or more tunable element settings, a component is configured to determine a Specific Absorption Rate (SAR) value, which is compared against an acceptable limit. If the SAR is within the limit, appropriate tuning control signals are provided to the tunable elements according to the defined tunable element settings. If the SAR is not within the limit or is about to exceed the limit, then the tunable element settings may be changed and retested.

34 Claims, 5 Drawing Sheets

(56) References Cited

U.S. PATENT DOCUMENTS

| | | | |
|---|---|---|---|
| 8,538,351 B2 * | 9/2013 | Wilson et al. | 455/127.1 |
| 8,565,205 B2 * | 10/2013 | Ho et al. | 370/338 |
| 8,731,496 B2 * | 5/2014 | Drogi et al. | 455/127.1 |
| 8,744,539 B2 * | 6/2014 | Pourseyed et al. | 455/575.7 |
| 8,774,853 B2 * | 7/2014 | Wilson et al. | 455/522 |
| 8,781,437 B2 * | 7/2014 | Ngai et al. | 455/404.1 |
| 8,798,662 B2 * | 8/2014 | Ali et al. | 455/522 |
| 8,798,664 B2 | 8/2014 | Yun | |
| 2005/0113103 A1 | 5/2005 | Snowden et al. | |
| 2005/0113125 A1 | 5/2005 | Kang | |
| 2007/0037619 A1 | 2/2007 | Matsunaga et al. | |
| 2007/0111681 A1 | 5/2007 | Alberth, Jr. et al. | |
| 2007/0216584 A1 | 9/2007 | Nishikido et al. | |
| 2009/0047998 A1 * | 2/2009 | Alberth, Jr. | 455/562.1 |
| 2011/0014879 A1 | 1/2011 | Alberth et al. | |
| 2011/0222469 A1 | 9/2011 | Ali et al. | |
| 2012/0077538 A1 | 3/2012 | Yun | |
| 2012/0190398 A1 | 7/2012 | Leukkunen | |
| 2012/0270592 A1 | 10/2012 | Ngai et al. | |
| 2013/0217450 A1 | 8/2013 | Kanj et al. | |
| 2013/0252658 A1 | 9/2013 | Wilson et al. | |
| 2013/0310105 A1 | 11/2013 | Sagae et al. | |
| 2014/0248892 A1 | 9/2014 | Wilson et al. | |

FOREIGN PATENT DOCUMENTS

| | | |
|---|---|---|
| EP | 0843421 | 5/1998 |
| EP | 1248379 | 10/2002 |
| EP | 1298809 | 4/2003 |
| EP | 1524774 | 4/2005 |
| EP | 2410661 | 1/2012 |
| KR | 20020052442 | 7/2002 |
| KR | 100663518 | 1/2007 |
| WO | 0205443 | 1/2002 |
| WO | 03013020 | 2/2003 |
| WO | 2008076024 | 6/2008 |
| WO | 2012068660 | 5/2012 |
| WO | 2013074295 | 5/2013 |

OTHER PUBLICATIONS

EPO, Extended Search Report, Application No. 10170152.2, Jan. 19, 2011, 7 pgs.
PCT, International Search Report and Written Opinion, Application No. PCT/CA2010/001864, Aug. 3, 2011, 8 pgs.
PCT, Written Opinion of the International Searching Authority, Application No. PCT/US2012/062813, Feb. 28, 2013, 10 pgs.
PCT, Notification Concerning Availability of the Publication of the International Application, Application No. PCT/US2012/062813, May 23, 2013, 1 pg.
USPTO, Office Action, U.S. Appl. No. 12/839,622, Dec. 21, 2012, 7 pgs.
USPTO, Office Action Ex parte Quayle, U.S. Appl. No. 12/839,622, Jan. 13, 2013, 6 pgs.
USPTO, Notice of Allowance, U.S. Appl. No. 12/839,622, May 13, 2013, 6 pgs.
International Commission on Non-Ionizing Radiation Protection, "Guidelines for Limiting Exposure to Time-Varying Electric, Magnetic, and Electromagnetic Fields (Up to 300 GHz)," ICNIRP Guidelines, Health Physics Society, Apr. 1998, vol. 74 Issue 4, 29 pgs.
Rich, Nathaniel, "For Whom the Cell Tolls, Why Your Phone May (or May Not) Be Killing You," Harper's Magazine, May 2010, 12 pgs.
Seabury, David, "An Update on SAR Standards and the Basic Requirements for SAR Assessment," ETS-Lingren, Apr. 2005, 8 pgs.
USPTO, Notice of Allowance and Fees Due, U.S. Appl. No. 13/898,098, Mar. 31, 2014, 8 pgs.
EPO, Communication pursuant to Rules 161(1) and 162 EPC, Application No. 12787600.1, May 5, 2014, 2 pgs.
EPO, Communication under Rule 71(3) EPC Intention to Grant, Application No. 10170152.2, May 26, 2014, 7 pgs.
USPTO, Notice of Publication of Application, U.S. Appl. No. 13/898,098, Sep. 26, 2013, 1 pg.
USPTO, Notice of Publication of Application, U.S. Appl. No. 13/880,412, Aug. 22, 2013, 1 pg.
PCT, Notification of Transmittal of the International Preliminary Report on Patentability, Application No. PCT/US2012/062813, Jan. 2, 2014, 13 pgs.
EPO, Communication Pursuant to Rules 161(2) and 162 EPC, Application No. 10860032.1, Jul. 3, 2013, 2 pgs.
PCT, Notification Concerning Transmittal of International Preliminary Report on Patentability, Application No. PCT/CA2010/001864, Jun. 6, 2013, 7 pgs.
USPTO, Supplemental Notice of Allowability, U.S. Appl. No. 12/839,622, Jul. 18, 2013, 2 pgs.
USPTO, Supplemental Notice of Allowability, U.S. Appl. No. 12/839,622, Aug. 15, 2013, 2 pgs.
EPO, Communication of European publication number and information on the application of Article 67(3) EPC, Application No. 12787600.1, Jun. 4, 2014, 1 pg.
CIPO, Notice of Allowance, Application No. 2,746,881, Jul. 3, 2014, 1 pg.
USPTO, Notice of Publication of Application, U.S. Appl. No. 14/278,051, Sep. 4, 2014, 1 pg.
USPTO, Office Action, U.S. Appl. No. 14/278,051, Oct. 8, 2014, 16 pgs.
USPTO, Notice of Allowance, U.S. Appl. No. 13/880,412, Oct. 3, 2014, 30 pgs.

* cited by examiner

RADIATION POWER LEVEL CONTROL SYSTEM AND METHOD FOR A WIRELESS COMMUNICATION DEVICE HAVING TUNABLE ELEMENTS

INCORPORATION BY REFERENCE TO RELATED APPLICATION(S)

This application discloses subject matter that may be related to the subject matter of the following U.S. patent application(s): (i) "TRANSMISSION CONTROL FOR A SPECIFIC ABSORPTION RATE COMPLIANT COMMUNICATION DEVICE", application Ser. No. 12/536,339, filed Aug. 5, 2009, now issued as U.S. Pat. No. 8,798,662; (ii) "MODULATION AND CODING SCHEME SELECTION METHOD FOR A SPECIFIC ABSORPTION RATE COMPLIANT COMMUNICATION DEVICE", application Ser. No. 12/722,362, filed Mar. 10, 2010, now issued as U.S. Pat. No. 8,358,615; and (iii) "RADIATION POWER LEVEL CONTROL SYSTEM AND METHOD FOR A WIRELESS COMMUNICATION DEVICE BASED ON A TRACKED RADIATION HISTORY", application Ser. No. 12/839,622, filed on Jul. 20, 2010, now issued as U.S. Pat. No. 8,538,351; which is (are) hereby incorporated by reference.

FIELD OF THE DISCLOSURE

The present patent disclosure generally relates to wireless communication devices, examples of which include mobile handheld devices such as pagers, cellular phones, personal digital assistants (PDAs), smartphones, wirelessly enabled portable computers, tablets, and the like. More particularly, and not by way of any limitation, the present patent disclosure is directed to providing radiation power level control with respect to a wireless communication device.

BACKGROUND

For many years the general public has been concerned about the possible health effects of exposure to electromagnetic radio frequency (RF) radiation. Although research is ongoing and there appears to be no scientific consensus on the subject at this time, there have been concerns expressed that high levels of radiation fields may cause a variety of physical effects on the human body. With the dramatic increase in public use of wireless communication devices, and particularly mobile telephones, it has become prudent to consider that these products do not expose their users to levels of radiation that may be excessive. At the frequencies at which most of these devices operate, the known physiological effects center around tissue heating. A measure of this heating effect is known as Specific Absorption Rate (SAR), which is defined as the time derivative of the incremental energy (dW) absorbed by or dissipated in an incremental mass (dm) contained in a volume (dV) of a given density ($\rho$).

As part of worldwide efforts to legislate on consumer health and safety aspects, many regulatory bodies in the United States of America as well as abroad (e.g., governmental agencies such as the Federal Communications Commission or FCC in the United States) now require products that are placed on the market to meet certain SAR limits. Measurement of SAR has therefore become mandatory for companies that make such products.

The basis for US requirements may be found in ANSI/IEEE C95.1 "*Safety Levels with Respect to Human Exposure to Radio Frequency Electromagnetic Fields, 3 kHz to 300 GHz*" which establishes exposure limits, and ANSI/IEEE C95.3 "*Recommended Practice for the Measurement of Potentially Hazardous Electromagnetic Fields—RF and Microwave*". These standards are reflected in the current FCC requirements found in 47 CFR §2.1091 and 2.1093. OET Supplement C 01:01 "Evaluating Compliance with FCC Guidelines for Human Exposure to Radiofrequency Electromagnetic Fields" gives guidance on the application of the FCC rules. (OET is the FCC's Office of Engineering and Technology). The FCC rules for evaluating portable devices for RF exposure compliance are contained in 47 CFR §2.1093. For these purposes, a portable device is defined as a transmitting device designed to be used with any part of its radiating structure in direct contact with the user's body or within 20 centimeters of the body of a user or bystanders under normal operating conditions. For distances greater than 20 centimeters, exposure evaluation is determined by the maximum permissible exposure limits (MPE) provided in OET 65.

For instance, the FCC limit for exposure from cellular telephones is a SAR level of 1.6 watts per kilogram (1.6 W/kg) averaged over 1 gram of tissue. The SAR scan test is usually 6 minutes for most technologies, depending on the number of channels tested and the technology tested for, except for those operating in the range of 5 GHz to 6 GHz. Tests for technologies operating at such higher RF levels typically require a smaller step size for the necessary volume scan, thereby giving rise to a testing time of about 15 minutes.

Because of the ever-improving advances in the wireless communication technologies, the regulations for limiting electromagnetic RF radiation are being continuously updated as well. With the change in usage of mobile phones and the concomitant advent of newer technologies, further regulatory changes are anticipated. Currently, with the goal of reducing the likelihood that cellular phone transmissions of electromagnetic radiation will cause harmful effects in users, government regulations in several countries limit the maximum power level with which the cellular phones can radiate. This limitation is tied to a SAR threshold. However, the SAR level for a wireless device is determined in a common, specified manner for all cellular phones, and if a proposed phone design exceeds the SAR threshold, the design of at least part of the RF transmitter system must be adjusted. These adjustments, if not handled well, can be detrimental to the efficiency and performance of the phone's RF systems.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
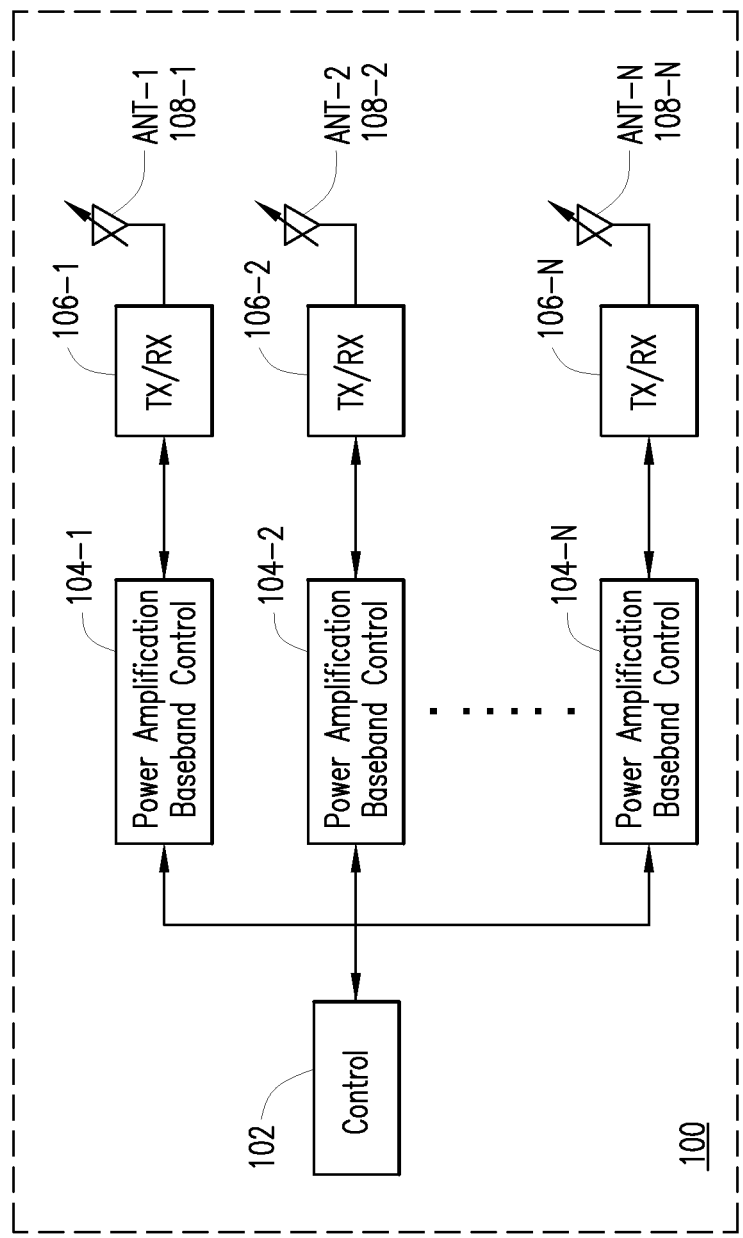
FIG. 1 depicts a block diagram of a wireless user equipment (UE) device wherein radiation/transmission power levels may be controlled in accordance with an embodiment of the present patent application.

The present patent disclosure is broadly directed to a radiation power level compliance and control scheme for a wireless UE device that includes one or more tunable elements such as, e.g., filters, tunable antennas, impedance matching circuits, amplifiers, capacitors, inductors and the like. In one embodiment, the wireless UE device may comprise a component configured to detect one or more changes with respect to at least one operational parameter associated with the wireless UE device. A component may be provided for determining that a tunable action is required with respect to at least one of the tunable elements. Upon defining one or more tunable element settings, a component is configured to determine a Specific Absorption Rate (SAR) value, which is compared against an acceptable limit, e.g., a regulatory body requirement. If the SAR is within the limit, appropriate tuning control signals may be provided to the tunable elements according to the defined tunable element settings. In one example implementation, a tracked radiation history, a usage mode history over a given period of time, or both may be utilized is determining the SAR values. If the SAR value is not within the limit or is about to exceed the limit, then the tunable element settings may be changed or otherwise redefined and retested.

In one aspect, an embodiment of a radiation power level control method for a wireless UE device including one or more tunable elements is disclosed. The claimed method comprises one or more of the following: determining that a tunable action is required with respect to at least one of the tunable elements of the wireless UE device; defining one or more tunable element settings; determining a SAR value based on the defined tunable element settings; determining that the SAR value is within a first acceptable limit; and responsive to determining that the SAR value is within the first acceptable limit (e.g., a threshold value), generating one or more tuning control signals to configure the one or more tunable elements according to the defined tunable element settings.

In another aspect, an embodiment of a non-transitory computer readable medium having program instructions stored thereon is disclosed, wherein the program instructions are executable by a processor of a wireless UE device for effectuating a radiation power level compliance control. The program instructions comprise one or more code portions configured for determining that a tunable action is required with respect to at least one of a plurality of tunable elements of the wireless UE device; defining one or more tunable element settings; determining a SAR value based on the defined tunable element settings; determining that the SAR value is within a first acceptable limit; and responsive to determining that the SAR value is within the first acceptable limit (e.g., a threshold value), facilitating generation of one or more tuning control signals to configure the one or more tunable elements according to the defined tunable element settings.

Embodiments of systems, methods, and associated tangible computer-readable media having instructions and tangible computer program products relating to a radiation power level compliance and control scheme of the present patent disclosure will now be described with reference to various examples of how the embodiments can be made and used. Like reference numerals are used throughout the description and several views of the drawings to indicate like or corresponding parts to the extent feasible, wherein the various elements may not necessarily be drawn to scale. Referring now to the drawings, and more particularly to FIG. 1, depicted therein is a block diagram of an example wireless UE device 100 wherein radiation transmission power may be controlled in accordance with an embodiment of the present patent application. By way of illustration, the wireless UE device 100 may be any cellular phone, mobile communications device, smartphone, PDA, wirelessly enabled portable computer or tablet, pager, and the like. The wireless UE device 100 may be provided with one or more appropriate transceiver and antenna arrangements, each of which may be adapted to operate in a certain frequency band (i.e., operating frequency or wavelength) depending on the radio access technologies of the communications networks such as, without limitation, Global System for Mobile Communications (GSM) networks, Enhanced Data Rates for GSM Evolution (EDGE) networks, Integrated Digital Enhanced Networks (IDEN), Code Division Multiple Access (CDMA) networks, Universal Mobile Telecommunications System (UMTS) networks, any 2nd- 2.5- 3rd- or subsequent Generation networks, Long Term Evolution (LTE) networks, or wireless networks employing standards such as Institute of Electrical and Electronics Engineers (IEEE) standards, like IEEE 802.11a/b/g/n standards or other related standards such as HiperLan standard, HiperLan II standard, Wi-Max standard, OpenAir standard, and Bluetooth standard, as well as any satellite-based communications technology such as GPS. Accordingly, the wireless UE device 100 may operate in one or more modes, bands, or radio technologies, and may be adapted to communicate using circuit-switched networks (CSNs), packet-switched networks (PSNs), or a combination thereof. The wireless UE 100 may therefore comprise a multimode wireless communication device which is not intended to be limited by any of the exemplary types of radio technologies, transceiver circuitry or radiation elements (i.e., antenna technologies, etc.) exemplified herein.

In FIG. 1, the wireless device 100 is illustrated with a plurality of transceivers 106-1 through 106-N, each having an associated tunable radiation element (i.e., tunable antenna) 108-1 through 108-N (i.e., a first antenna, a second antenna, etc.) for transmitting and receiving RF signals carrying information. While each transceiver is shown as being coupled to a corresponding tunable antenna or radiation element, in other embodiments two or more transceivers may share a common antenna. Additionally, each transceiver may be associated with suitable power amplification and baseband controller circuitry 104-1 through 104-N, which may also include Layer software/firmware functionality. In alternative embodiments, the power amplification and baseband controller circuitries may be implemented as a single entity, for example, a digital signal processor (DSP) (not explicitly shown in FIG. 1). Regardless of how the power amplification and baseband controller circuitry may be implemented, those skilled in the art will recognize that the circuitry may comprise a number of tunable electronic components, e.g., filters, amplifiers, capacitors, inductors, impedance matching circuits, and the like, that can be tuned to various settings. For purposes of the present patent application, a tunable element or component may be defined as a component or circuit that could change its properties, hence, its response. Broadly, tunability of a component may therefore be understood as the property of the component such that its input/output transfer function varies the output response in accordance with at least one varying input.

The wireless UE device 100 also includes a controller 102 configured to control the output power of the transmitters according to one or more embodiments set forth hereinbelow in further detail. More generally, in embodiments where there are multiple transceivers, the controller may control the output power of one or more transmitters, or any subset thereof, depending on one or more radiation power compliance/control scenarios and associated control logic exemplified in the present patent application. Those skilled in the art will recognize that the controller controls the settings of the tunable elements/circuits, hence controls at least indirectly the transmitted power levels, and may be implemented as part of one or more processors, for example, a common DSP, or may be implemented as a separate control entity. For instance, the control functionality may be implemented by a programmably controlled processor using software stored in memory. Moreover, the control functionality may be effectuated under local control (i.e., based on executable control logic resident on the wireless UE device), or under control from a suitable network infrastructure element (e.g., a network node such as a base station or some other network node executing suitable service logic configured to receive information indicative of transmission radiation power levels of a wireless device or information indicative of a tunable action as detected by the wireless UE device and operate thereon to generate control signals), or based on any combination thereof.

Figure 2:
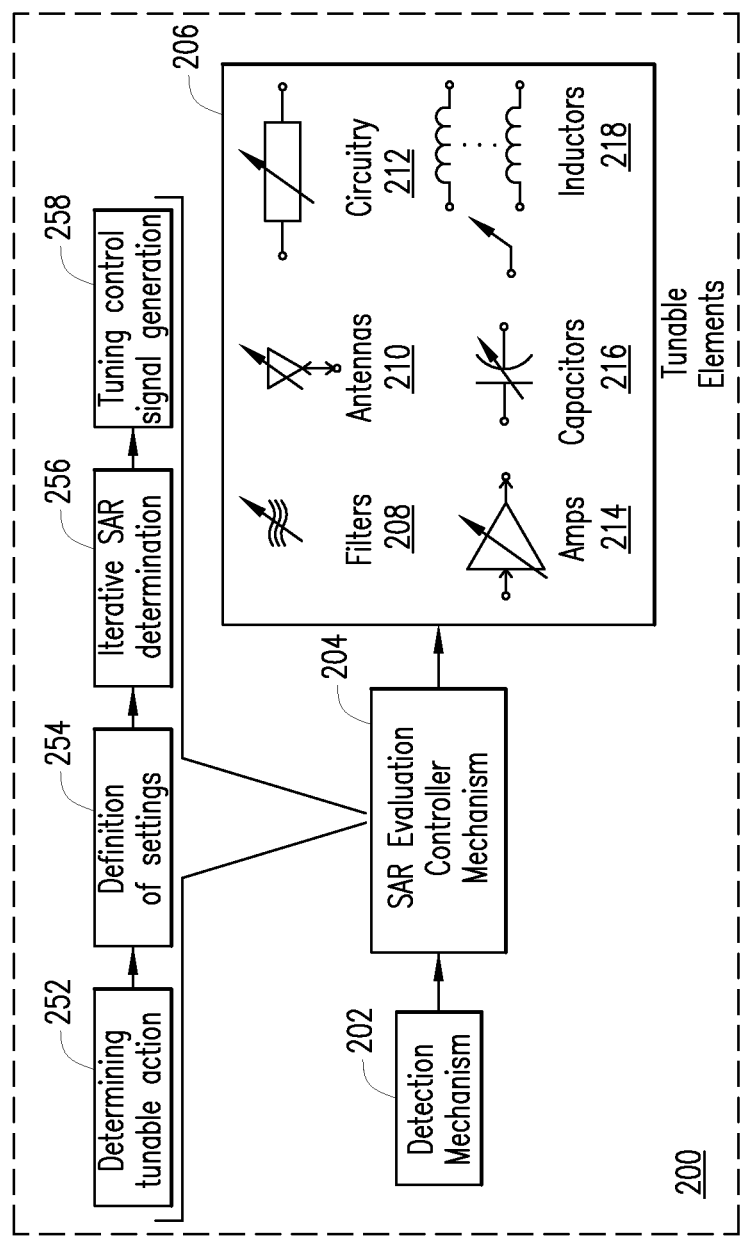
FIG. 2 depicts a block diagram of a further embodiment of a wireless UE device including one or more tunable elements for purposes of the present patent application.

FIG. 2 depicts a block diagram of a further embodiment of a wireless UE device 200 including one or more tunable elements in accordance with the teachings of the present patent application. A detection mechanism 202 may be provided for detecting one or more changes in at least one operational parameter associated with the UE device 200, for example, device usage modes, radio channel condition(s), transmission event modes, indication of presence or absence of elements affecting the electromagnetic environment within which the UE device 200 is operating and the like. An example device usage mode may be where the wireless UE device is normally positioned near a user's ear for making a phone call. Another example usage mode may be where the wireless UE device is placed in a holster that is positioned adjacent to the user's body. Another example usage mode is where the wireless UE device is placed in a bag, a purse, or a holster, or some container, which may be positioned near the user or at a point away from the user. A still further usage mode is where the wireless UE device is placed in a speakerphone mode and is positioned away from the user's body and/or placed on a desk, for example. It should be apparent that the usage modes set forth in the foregoing non-limiting list are merely illustrative and any number of usage modes may be realized depending on a particular implementation for purposes of the present patent application.

By way of an example implementation, the detection mechanism 202 may be configured to identify or otherwise detect a current usage mode in which the handset (i.e., the wireless UE device 200) is being used based on collecting what may be referred to as "situational data". For instance, such situational data may include but not limited to the wireless UE device's orientation, proximity to a user of the wireless UE device, motion or movement associated with the wireless UE device, indication of usage of a keypad of the wireless UE device, indication of usage of a touch screen of the wireless UE device, indication of usage of a speaker and/or a microphone of the wireless UE device, location of the wireless UE device, location of any impediments relative to the wireless UE device (e.g., a user's hands, etc.), location of obstructions such as tunnels, trees, tall buildings, topographic features affecting radio communications, etc., indication of usage of a short-range radio frequency communication subsystem of the wireless UE device (e.g., Bluetooth communications or WiFi communications, etc.), global positioning information, identification of one or more radio access technologies (RATs) being used by the wireless UE device, and the like.

Appropriate hardware, software and/or firmware components may be provided with the wireless UE device 200 that are configured for collecting one or more pieces of the foregoing situational data that can also include time duration in any combination. For example, an accelerometer may be provided that detects movement of the wireless UE device in one or more axes of the device. In one embodiment, the X axis may be defined along the width of the wireless UE device, with positive values in the right hand direction; the Y axis may be defined along the length of the wireless UE device, with positive values on the "down" direction; and the Z axis along the depth of the wireless UE device, i.e., going through the body or screen of the device. Such an accelerometer may detect movement in the three axes by sensing small voltage changes that occur in the accelerometer during movement in each of the three axes. The voltage changes may then be processed to determine or estimate whether a user of the wireless UE device is walking, cycling, running, in a car, etc. Such information may then be processed in conjunction with other collected situational data to determine, identify or otherwise estimate a usage mode of the wireless UE device or a change therein. For example, if the user is walking and watching a video, then it may be predicted, expected, estimated or otherwise determined with a level of likelihood that the user is holding the UE device in his hand and watching the video. However, if the user is cycling and listening to online music, it is more likely that the UE device is in a usage mode where the device is in the user's pocket or on his arm or on his body in a holder, holster or a clip and the like.

Another component that may be provided as part of the wireless UE device 200 with respect to collecting the situational data is a gyroscope that may be used to determine the device orientation by measuring the angular movements along any of the three axes. When a sensing element of the gyroscope shakes or tilts, the gyroscope changes the level whereby a corresponding voltage change is generated. The voltage changes may then be used to calculate the angle/orientation of a moving object. For purposes of the present disclosure, any appropriate type of gyroscopes may be used for determining orientation, e.g., electromechanical gyroscopes, electronic or solid-state gyroscopes, laser gyroscopes, micro-electro mechanical systems (MEMS) gyroscopes, and the like. Regardless of the type of gyroscopes used, the angular orientation of the wireless UE device may be referenced to a universal coordinate system. Based on such situational data, an appropriate process executing on the wireless UE device may be used to determine or otherwise estimate how/whether the UE device is held or oriented in a particular fashion.

Other components and techniques, e.g., motion sensors, proximity sensors, location sensors, biometry-based sensors, thermal sensors, tactile sensors, optical sensors, etc. may also be provided in the wireless UE device for collecting one or more pieces of the situational data. Such techniques, for example, may be adapted to provide an indication of whether one or more subsystems of the wireless UE device are being used, such as, the keypad, speaker/microphone, short-range communication system, etc., in addition to collecting information relative to the physical environment in which the wireless UE device is placed.

Based on the foregoing, accordingly, a multivariate collection of situational data may be used by the detection mechanism 202 for identifying or otherwise estimating a usage mode of the wireless UE device 200 or a change therein. It will be apparent to one skilled in the art that any number of usage modes may be defined for a wireless UE device based on the way the device is contemplated for use.

As to radio channel conditions, the detection mechanism 202 may be configured to sense a number of parameters such as the intra- and inter-channel interference levels, signal to interference ratios (SIRS), signal to noise ratio (SNR) levels, inter-symbol interference (ISI) delays and associated location information, and the like. Further, various transmission event modes may also be detected by the detection mechanism 202 for purposes of the present patent application. Such transmission event modes may comprise, e.g., a voice call mode, a video call mode, a data session mode, a multimedia call mode, a Voice over Internet Protocol (VoIP) mode, a speakerphone mode, an uplink communications mode, etc., essentially any event that may have an impact on the transmit power level of the wireless UE device 200 and therefore may have an effect on the SAR to which the user may be exposed.

In addition, the wireless UE device 200 may be exposed to various conductive elements that may impact the electromagnetic environment of the UE device. Accordingly, related operational parameters associated with the UE device 200 that are detected by the detection mechanism 202 may also include the presence or absence of such elements, for example including but not limited to, proximity and/or positioning of at least a portion of a user's body (e.g., relative positioning of the user's hand(s) around the device, whether the device is placed near the user's ear, etc.), metal objects such as the user's jewelry, power transmission lines, electric poles, and the like.

As illustrated, the wireless UE device 200 may include a number of tunable elements 206 such as, for example, one or more filters 208, one or more antennas 210, one or more impedance matching circuits 212, one or more amplifiers 214, one or more capacitors 216, one or more inductors 208, and the like, whose operational settings may impact or otherwise control the level of transmission power radiating from the device antennas. Those skilled in the art will recognize that the example tunable elements 206 shown in FIG. 2 may comprise at least portions of the circuitry blocks shown in FIG. 1 and may therefore be arranged in a number of functional and structural arrangements depending on the exact design of a wireless UE device.

A SAR evaluation controller mechanism 204 of the wireless UE device 200 is configured to facilitate a radiation power compliance scheme for purposes of the present patent application. In one example embodiment, the SAR evaluation controller mechanism 204 may include a module 252 for determining that a tuning action is required responsive to one or more changes detected by the detection mechanism 202 relative to the operation of the wireless UE device 200. For example, a change in the device usage mode may be detected (from a data download session to a voice call) and such a change may need to be accounted for in ensuring SAR compliance. Another example may be where the device user enters into an outdoor area that has electrically conductive elements capable of affecting the antenna performance. Accordingly, determining module 252 may be configured to determine that a tuning action relative to one or more tuning elements may be taken so as to potentially compensate for such detected changes. Another module 254 of the SAR evaluation controller mechanism 204 may be configured for facilitating defining or redefining one or more settings of at least one tunable element for purposes of calculating, computing or otherwise determining a SAR value based on the defined tunable element settings. Another example would be that the usage mode has not changed but the time duration of the mode is causing the SAR limits to be exceeded in the current time or in the foreseeable time, hence, a change in the tunable element/circuit setting would be required to maintain the SAR compliance limit. A SAR determination module 256 may therefore be provided as part of the SAR evaluation controller mechanism 204 for purposes of achieving SAR level compliance as will be set forth in additional detail hereinbelow. A tuning control signal generator module 258 is operable to generate appropriate control signals to tune one or more tuning elements according to the settings that yield an acceptable SAR value.

Figure 3:
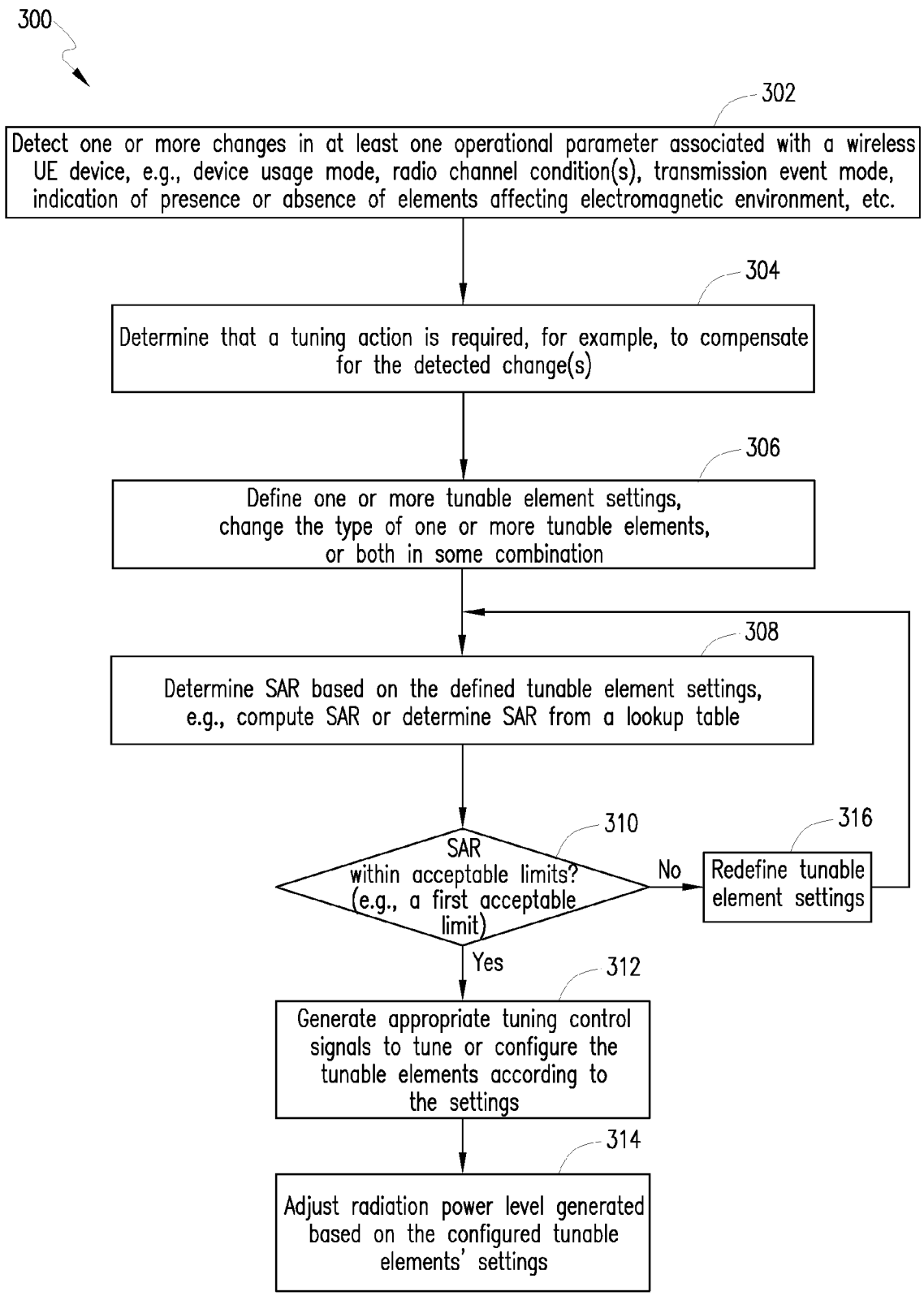
FIG. 3 is a flowchart of an example radiation power level compliance and control scheme according to one embodiment.

Referring now to FIG. 3, depicted therein is a flowchart of an example radiation power level compliance and control scheme 300 according to one embodiment that may be implemented as part of the SAR evaluation controller mechanism 204 of the UE device 200 discussed above. At a high level, the controller mechanism may be configured to be responsible for: (1) taking note that a tunable action is required; (2) defining the required changes and settings needed in one or more tunable elements; (3) determining whether the defined settings yield a SAR value that violates a SAR limit; and (4) responsive to determining that the defined settings yield a SAR value that violate a SAR limit, selecting a response action that does not violate SAR limits, e.g., including but not limited to one or more of the following: (a) accepting the settings and reducing the transmit power level; (b) accepting the settings and reducing the transmit duty cycle; and (c) selecting one or more alternative tuning settings that improve antenna tuning while not violating SAR.

As set forth previously, a tunable action may be indicated based on detecting a change in one or more operational parameters associated with the wireless UE device. Accordingly, a usage mode estimator executing as part of the detection mechanism 202 on the wireless UE device 200 may use any heuristic, probabilistic, deterministic, rule-based, fuzzy-logic-based, or learning-based process that can synthesize the multivariate situational data and arrive at the device usage mode and its duration. Likewise, appropriate logic or functionality of the detection mechanism 202 may identify any changes in the radio channel conditions, transmission event mode, etc. (block 302). A determination is made that a tunable action is required with respect to at least one of the tunable elements of the wireless UE device, for example, responsive to or to compensate for the detected changes (block 304). One or more tunable settings may be defined or selected to have certain initial values, or the type(s) of tunable elements may be changed, or both in some combination (block 306) for purposes of iterative SAR determination until an acceptable SAR value is determined.

In one implementation, the iterative SAR determination process is illustrated by blocks 308, 310 and 316 of the flowchart of FIG. 3. For instance, after the tuning settings are defined by the SAR evaluation controller mechanism, the process of determining one or more instantaneous SAR values based on the defined settings may commence. As set forth in block 308, the SAR value may be determined via two options. In one option, a lookup table may be queried (e.g., an off-line query) which includes pre-computed data of the power levels and the corresponding SAR measured values and limits associated with the defined or selected tunable settings. The lookup table may be provided as a local database structure on the wireless UE device or may be provisioned as a remote database structure in a network. In another variation, the local lookup table, which may be implemented in a non-volatile memory, may be updated by a network node at different times. In a second option, the instantaneous SAR value may be determined or predicted by extrapolation or other computations according to a mathematical formula or model based on the defined power limits, the time duration, and tunable element settings. Where a multi-mode transmission event is taking place, i.e., with more than one transceiver plus antenna combination being effective, the computed SAR value may be a summation of the SAR components computed for each transceiver plus antenna combination. In one embodiment, a new SAR value may be computed as a function of nominal SAR (which itself is dependent on the operating frequency and may be determined during the design of a particular wireless UE device), nominal power level, and nominal transmission configuration (including a nominal number of transmission slots and associated modulation/coding scheme, for instance) and other related parametrics. Additional details regarding transmission power level measurements, SAR computations and MCS adjustment schemes may be found in the following co-pending, commonly assigned U.S. patent applications: (i) "TRANSMISSION CONTROL FOR A SPECIFIC ABSORPTION RATE COMPLIANT COMMUNICATION DEVICE", application Ser. No. 12/536,339, filed Aug. 5, 2009, now issued as U.S. Pat. No. 8,798,662; and (ii) "MODULATION AND CODING SCHEME SELECTION METHOD FOR A SPECIFIC ABSORPTION RATE COMPLIANT COMMUNICATION DEVICE", application Ser. No. 12/722,362, filed Mar. 10, 2010, now issued as U.S. Pat. No. 8,358,615; which are hereby incorporated by reference.

Continuing to refer to the flowchart of FIG. 3, a determination is made if the SAR value is within an acceptable limit (e.g., a first acceptable limit or a first threshold value) (block 310) according to a regulatory body compliance scheme (e.g., the FCC SAR compliance scheme). If the SAR value is not within the acceptable limit, one or more tunable element settings and the type of tunable elements may be redefined (block 316) and a new SAR determination may be made (block 308). Accordingly, in one embodiment, the acts of defining/redefining the tunable element settings, SAR determination/re-determination and compliance verification may iteratively take place until the SAR value is determined to be within an acceptable limit. When the SAR value is determined to be acceptable, appropriate tuning control signals may be generated to tune or otherwise configure the tunable elements according to the settings that yielded the acceptable SAR value (block 312). By tuning the tuning elements accordingly, the transmit power level radiating from the antenna elements may therefore be adjusted in a SAR compliant manner (block 314).

As a further variation of the process set forth above, a decision may be made not to proceed with the defined settings based upon the verification that the determined SAR value did not satisfy an acceptable level. Instead, other responses may be taken, e.g., including but not limited to providing a user alert, reducing the transmit power level based on additional radiation power level control schemes, reducing the transmit duty cycle, varying the MCS used by the wireless UE device (including the number of transmission slots, for instance, as well as changing the MCS from a scheme of quadrature phase shift keying (QPSK) with a suitable coding rate (for instance, $\frac{1}{3}$, $\frac{1}{2}$ or $\frac{2}{3}$) to a scheme of quadrature amplitude modulation (QAM) at coding rates of $\frac{1}{2}$, $\frac{2}{3}$, or so on), terminating the transmission event, providing a notification or indication to a serving node, e.g., a base station or an enhanced/evolved Node B (if the control process is executed on the wireless UE device), providing a control signal or notification to the wireless UE device (if the process is executed at a network node), delaying the transmission event in the case of delay-tolerant transmission, and the like.

Figure 4:
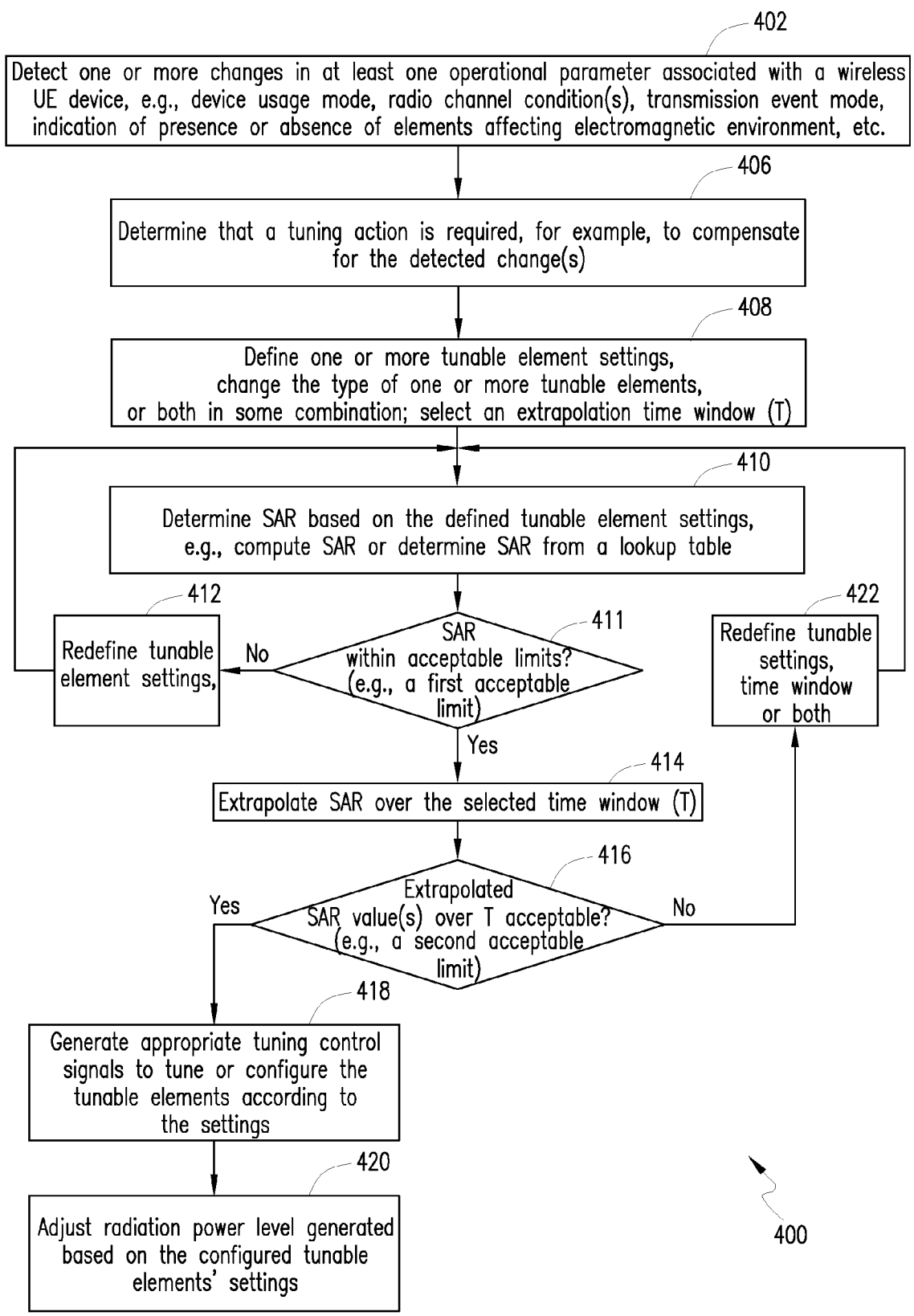
FIG. 4 is a flowchart of an example radiation power level compliance and control scheme according to another embodiment.

FIG. 4 depicts a flowchart of another example embodiment of a radiation power level compliance and control scheme 400. As with the control scheme 300 described above, the control scheme 400 may also be implemented as part of the SAR evaluation controller mechanism 204 of the UE device 200 discussed above. Whereas the control scheme 400 is similar to the control scheme 300, it is more comprehensive in that it covers tunable element settings as well as extrapolation of SAR values over a period of time in order to take into consideration that an instantaneous SAR value may be expected to be maintained over a certain duration depending the usage mode. At a high level, accordingly, the controller mechanism may be configured to verify not only that an instantaneous SAR value (determined via a computational mechanism or via a lookup query) satisfies an acceptable limit, but also that the SAR values extrapolated over a certain time period (i.e., extrapolated SAR values) are also acceptable according to a regulatory compliance scheme. Thus, both tunable element settings as well as an extrapolation time window may be iteratively redefined until each of these two limits or conditions are satisfied. Apart from these considerations, the overall functionality of control scheme 400 is generally similar to the functionality of control scheme 300 illustrated in FIG. 3.

As set forth previously, a tuning action may be indicated based on detecting a change in one or more operational parameters associated with the wireless UE device (blocks 402, 406). At block 408, one or more tunable element settings may be defined and the type of one or more tunable elements may be changed. In addition, an extrapolation time window (T) may be selected. At block 410, an instantaneous SAR value may be determined as before. If the determined SAR value is within an acceptable limit (e.g., a first acceptable limit or a first threshold value), the SAR value is then extrapolated over the selected time window based on predicted power limits as well as the defined tunable element settings (blocks 411, 414). If the determined SAR value is not within the first acceptable limit, the tunable element settings are redefined (block 412) and a new SAR value is determined based on the redefined tunable element settings (block 410). Accordingly, a first iterative process comprising the acts of defining/redefining the tunable element settings, instantaneous SAR value determination/re-determination and compliance verification may take place similar to the iterative process of control scheme 300 until the SAR value is determined to be within the first acceptable limit.

When the instantaneous SAR value is determined to be acceptable (block 411), it is extrapolated over the time period T and a further determination is made if the extrapolated SAR value(s) satisfy another acceptable limit (e.g., a second limit or a second threshold value) as set forth at block 416. In one implementation, both first and second acceptable limits or thresholds may be the same. If the extrapolated SAR values are within the acceptable limits, the tuning element settings are approved and appropriate tuning control signals are generated accordingly for tuning or otherwise configuring the tunable elements consistent with the approved settings (block 418). Transmit power levels radiating from the device antenna(s) may therefore be adjusted based on the approved settings of the configured tunable elements. On the other hand, if the extrapolated SAR values are determined to be unacceptable (block 411), the control scheme 400 is configured to redefine the tunable element properties (e.g., the settings), extrapolation time window, or both for commencing the iterative processes again (block 422).

Figure 5:
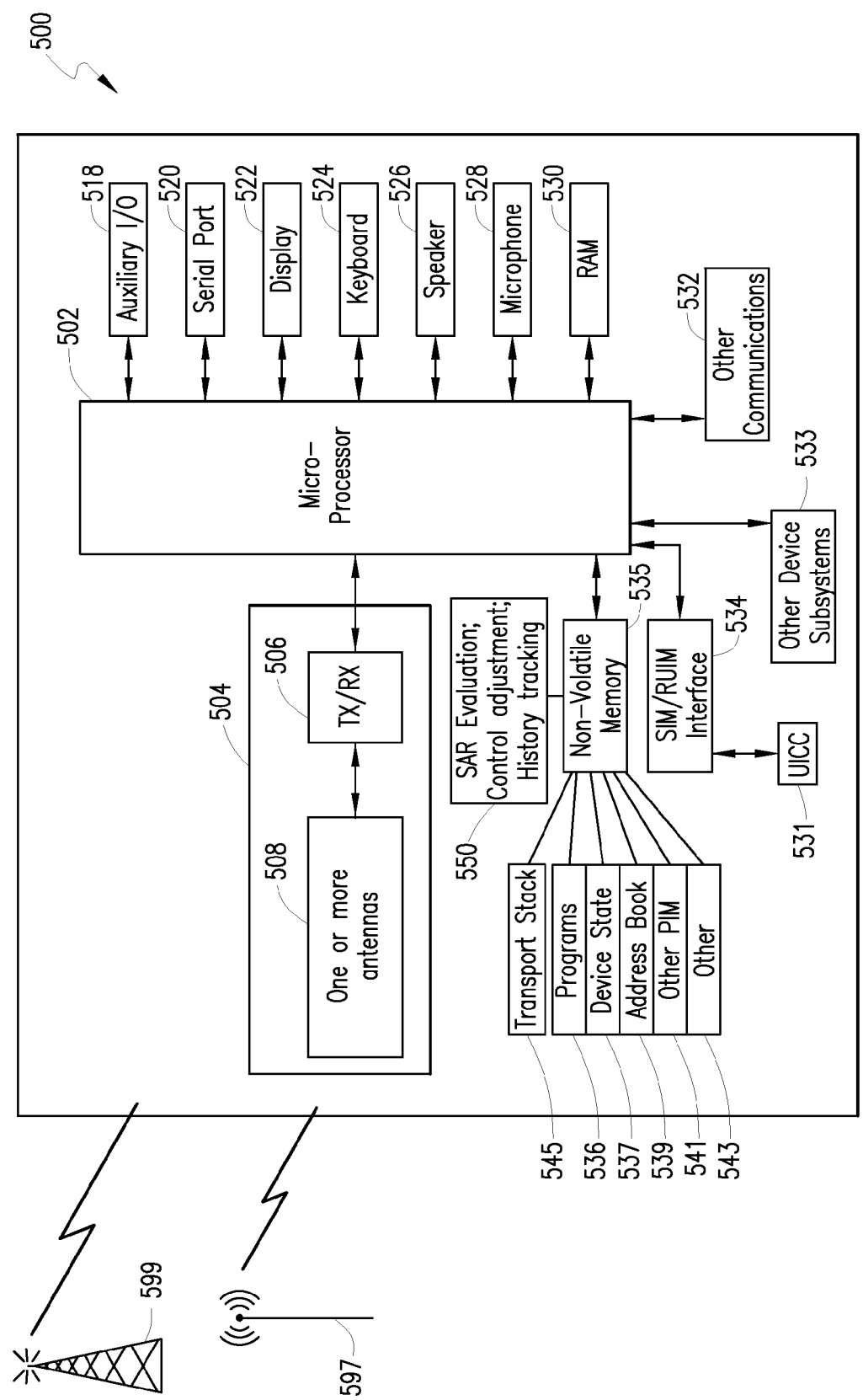
FIG. 5 depicts a block diagram of a wireless UE device with additional details wherein an embodiment of a radiation power level compliance and control scheme may be implemented.

FIG. 5 depicts a block diagram of an example wireless UE device 500 according to the teachings of the present patent application wherein an embodiment of a radiation power level compliance and control scheme may be implemented. It should be understood that the wireless UE device 500 may be another embodiment of a wireless UE device such as the device 100 depicted in FIG. 1 or the device 200 depicted in FIG. 2, but with additional structural and functional elements shown therein. Wireless UE device 500 may be provided with a communication subsystem 504 that includes an antenna assembly 508 and suitable transceiver circuits 506 whose power output levels can be controlled according to one or more embodiments of the present disclosure. A microprocessor 502 providing for the overall control of the device 500 is operably coupled to the communication subsystem 504, which can operate with various radio access technologies, operating bands/frequencies and networks (for example, to effectuate multi-mode communications in voice, data, media, or any combination thereof). As will be apparent to those skilled in the field of communications, the particular design of the communication module 504 may be dependent upon the communications network(s) with which the device is intended to operate, e.g., as exemplified by infrastructure elements 599 and 597. Further, the antenna assembly 508 may comprise radiation elements that may be realized in any known or heretofore unknown elements such as, e.g., a patch antenna, an inverted F antenna (IFA) strip, a modified inverted F antenna (MIFA) strip, a planar inverted F antenna (PIFA) strip, and the like, in any shape, size and form factor.

Microprocessor 502 also interfaces with additional device subsystems such as auxiliary input/output (I/O) 518, serial port 520, display 522, keyboard 524, speaker 526, microphone 528, random access memory (RAM) 530, other communications facilities 532, which may include for example a short-range RF communications subsystem, and any other device subsystems generally labeled as reference numeral 533. Example additional device subsystems may include accelerometers, motion sensors, temperature sensors, and the like. To support access as well as authentication and key generation, a SIM/USIM interface 534 (also generalized as a Removable User Identity Module (RUIM) interface) is also provided in communication with the microprocessor 502 and a UICC 531 having suitable SIM/USIM applications. In one implementation, a notification module may be configured to provide a notification message to, for example, a user or a network node, to indicate one or more responses from the detection mechanism of the UE device that a change in one or more operational parameters of the UE device has occurred and/or a tuning action is required. Additional notifications may also be generated responsive to SAR compliance determinations as noted above with respect to the flowcharts of FIGS. 3 and 4. The notification messages may be provided to a user by way of the display 522 or speaker 526, for example. The notification messages may be provided to a network node via transceiver circuits 506, serial port 520 or other communications facilities 532, for example. In some embodiments, microprocessor 502 can be configured to carry out, in conjunction with one or more subsystems of the UE device 500 described herein, one or more operations of the SAR compliance and power control schemes set forth hereinabove.

Operating system software and other system software may be embodied in a persistent storage module 535 (i.e., non-volatile storage) which may be implemented using Flash memory or another appropriate memory. In one implementation, persistent storage module 535 may be segregated into different areas, e.g., transport stack 545, storage area for computer programs 536, as well as data storage regions such as device state 537, address book 539, other personal information manager (PIM) data 541, and other data storage areas generally labeled as reference numeral 543. Additionally, the persistent memory may include appropriate software/firmware 550 necessary to effectuate transmission power level measurement and computations, SAR determinations, power level adjustment control, power data history tracking and associated database(s), SAR lookup tables based on tunable element settings, and the like, in conjunction with one or more subsystems set forth herein under control of the microprocessor 502 or specialized DSP circuitry. Powered components may receive power from any power source (not shown in FIG. 5). The power source may be, for example, a battery, but the power source may also include a connection to power source external to wireless UE device 500, such as a charger.

Those skilled in the art will recognize upon reference hereto that the foregoing embodiments can facilitate maintaining of handset compliance with applicable regulatory standards and requirements while delivering acceptable performance to consumers, when the SAR regulations are updated to their likely natural next stage because of the constant evolution in telecommunications technologies resulting in ever smarter phones. A regulatory change, which addresses the various concerns set forth in the present patent disclosure may require a two-stage testing method for SAR: (i) Stage 1: prior to certification for sale; and (ii) Stage 2: while the phone is in use. In the Stage 1 phase (i.e., prior to certification), it is envisaged that a certification authority not only runs the standard SAR test but also verifies that the phone meets the regulatory criteria for ongoing operation, i.e., the certification/compliance authority verifies that a radiation power control scheme and associated SAR evaluation control as well as the parameters installed in the phone to measure or otherwise determine SAR while the phone is in use meet the applicable regulatory requirements. In the post-certification Stage 2 phase (i.e., the phone is in use), it is envisaged that the SAR evaluation and radiation power control scheme software in the phone may be executed at certain times, e.g., periodically to evaluate the SAR levels during each usage mode and upon each tuning action in the device circuitry, taking the appropriate action at the device to maintain the SAR levels. It should be appreciated that such SAR evaluation and power control software may be preloaded into the device or may be pushed by, for example, the device manufacturer, a third-party software provider, a network operator, and the like. Furthermore, it is possible that further regulatory changes may be made once the devices are in operation, which may necessitate pushing appropriately updated SAR evaluation and radiation power control scheme software to the devices.

The embodiments of the present patent application take into consideration the tunability of the various smartphone components as well as the need for tracking recent transmission power level history and duration, in order to assist the smartphone in determining how much budget is available for current and expected transmission power needs. Accordingly, the present patent application addresses a comprehensive approach based on a tunable device usage (mode and duration) in association with SAR measurement impacts. The embodiments disclosed herein provide a fundamentally necessary component for a tunable system design that may be required for regulatory compliance: a class controlling methodology that accounts for the transmission power level based on configurable settings of the tunable elements. In one class, e.g., Class 1, tunability settings may be configured or iteratively reconfigured for satisfying an instant power allowance.

The control scheme embodiment of FIG. 3 may be implemented for realizing this methodology. In another class, e.g., Class 2, tunability settings may be configured or iteratively reconfigured based on extrapolated power allowance, which may be implemented by an embodiment of the control scheme set forth in FIG. 4.

The solutions proposed hereinabove are therefore amenable to: (i) addressing the change in real-time of the handset circuitry, i.e., a tunable handset, while in use by the user (hence maximizing the handset performance while maintain its SAR compliance in real-time); (ii) maintaining continuity between calls wherein a radiation/usage tracking history may be utilized for extrapolating predicted SAR values over a tracking horizon; and (iii) defining the settings of tunable elements including their properties and the duration of operation based on a continually SAR compliant handset device.

Various processes, structures, components and functions set forth above in detail, associated with one or more network nodes or a wireless UE device, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A radiation power level control method for a wireless user equipment (UE) device including one or more tunable elements, said method comprising:
    determining that a tunable action is required with respect to at least one of said tunable elements of said wireless UE device;
    defining one or more tunable element settings;
    determining a Specific Absorption Rate (SAR) value based on said defined tunable element settings; and
    performing an iterative SAR determination comprising:
        determining whether said SAR value is within a first acceptable limit; if so, generating one or more tuning control signals to configure said one or more tunable elements according to said defined tunable element settings; and if not, redefining said one or more tunable element settings, re-determining said SAR value, and re-performing the iterative SAR determination until said SAR is within said first acceptable limit.

2. The radiation power level control method of claim 1 wherein said SAR value is determined by computing a mathematical formula.

3. The radiation power level control method of claim 1 wherein said SAR value is determined by querying a lookup table.

4. The radiation power level control method of claim 3 wherein said lookup table is locally provided on said wireless UE device.

5. The radiation power level control method of claim 4 wherein said lookup table is updated by a network node.

6. The radiation power level control method of claim 3 wherein said lookup table is remotely provided at a network node serving said wireless UE device.

7. The radiation power level control method of claim 1 wherein said determining that a tunable action is required is based on detecting one or more changes with respect to at least one operational parameter associated with said wireless UE device.

8. The radiation power level control method of claim 7 wherein said at least one operational parameter associated with said wireless UE device comprises at least one of a device usage mode, a transmission time duration, a transmission event mode, a radio channel condition, and an indication of presence or absence of a conductive element that can change an electromagnetic condition around said wireless UE device.

9. The radiation power level control method of claim 8 wherein said device usage mode comprises at least one of a speakerphone mode, a mode of positioning said wireless UE device near a user's ear, a mode of placing said wireless UE device in a user's holster, and a mode of placing said wireless UE device at a place positioned away from a user's body.

10. The radiation power level control method of claim 8 wherein said transmission event mode comprises at least one of a voice call mode, a data session mode, and an uplink event mode.

11. The radiation power level control method of claim 8 wherein said conductive element that can change an electromagnetic condition around said wireless UE device comprises at least a portion of a user's body, the user's jewelry, a power transmission line, a conductive structural member of a building where said wireless UE device is disposed and an outdoor or indoor conductive member.

12. The radiation power level control method of claim 1 further comprising adjusting a transmission power level of said wireless UE device based on said settings of said configured tunable elements.

13. The radiation power level control method of claim 1 further comprising:
    selecting an extrapolation time window (T);
    responsive to determining that said SAR value is within said first acceptable limit, extrapolating said SAR value over said extrapolation time window to obtain an extrapolated SAR value; and
    determining that said extrapolated SAR value is within a second acceptable limit.

14. The radiation power level control method of claim 13 further comprising:
    if said extrapolated SAR value is not within said second acceptable limit, iteratively redefining said one or more tunable element settings, varying said extrapolation time window, or both, and re-determining said SAR value and re-extrapolating said SAR value until said re-extrapolated SAR value is within said second acceptable limit.

15. A wireless user equipment (UE) device comprising:
a processor configured to control one or more subsystems of said wireless UE device including a plurality of tunable elements; and
a non-volatile memory module having program instructions which, when executed by said processor, are configured to perform the following:
determining that a tunable action is required with respect to at least one of said tunable elements of said wireless UE device;
defining one or more tunable element settings;
determining a Specific Absorption Rate (SAR) value based on said defined tunable element settings; and
performing an iterative SAR determination comprising:
determining whether said SAR value is within a first acceptable limit; if so, generating one or more tuning control signals to configure said one or more tunable elements according to said defined tunable element settings; and if not, redefining said one or more tunable element settings, re-determining said SAR value, and re-performing the iterative SAR determination until said SAR is within said first acceptable limit.

16. The wireless UE device of claim 15 wherein said SAR value is determined by using a mathematical formula.

17. The wireless UE device of claim 15 wherein said SAR value is determined by querying a lookup table.

18. The wireless UE device of claim 17 wherein said lookup table is locally provided on said wireless UE device.

19. The wireless UE device of claim 17 wherein said lookup table is remotely provided at a network node serving said wireless UE device.

20. The wireless UE device of claim 15 wherein said determining that a tunable action is required with respect to at least one of said tunable elements is performed responsive to detecting one or more changes with respect to at least one operational parameter associated with said wireless UE device.

21. The wireless UE device of claim 20 wherein said at least one operational parameter associated with said wireless UE device comprises at least one of a device usage mode, a transmission event mode, a radio channel condition, and an indication of presence or absence of a conductive element that can change an electromagnetic condition around said wireless UE device.

22. The wireless UE device of claim 21 wherein said device usage mode comprises at least one of a speakerphone mode, a mode of positioning said wireless UE device near a user's ear, a mode of placing said wireless UE device in a user's holster, and a mode of placing said wireless UE device at a place positioned away from a user's body.

23. The wireless UE device of claim 21 wherein said transmission event mode comprises at least one of a voice call mode, a data session mode, and an uplink event mode.

24. The wireless UE device of claim 15 wherein said non-volatile memory module further comprises program instructions configured to adjust a transmission power level of said wireless UE device based on said settings of said configured tunable elements.

25. The wireless UE device of claim 15 wherein said plurality of tunable elements comprises one or more of filters, antennas, amplifiers, capacitors, inductors, and impedance matching circuits.

26. The wireless UE device of claim 15 wherein said non-volatile memory module further comprises:
program instructions configured for setting an extrapolation time window (T);
program instructions, responsive to determining that said SAR value is within said first acceptable limit, configured to extrapolate said SAR value over said extrapolation time window to obtain an extrapolated SAR value; and
program instructions configured to determine that said extrapolated SAR value is within a second acceptable limit.

27. The wireless UE device of claim 26 wherein said non-volatile memory module further comprises program instructions, responsive to determining that said extrapolated SAR value is not within said second acceptable limit, configured to iteratively redefine said one or more tunable element settings, vary said extrapolation time window, or both, and re-determine said SAR value and re-extrapolate said SAR value until said re-extrapolated SAR value is within said second acceptable limit.

28. A non-transitory computer readable medium having program instructions stored thereon, the program instructions when executed by a processor of a wireless user equipment (UE) device, are configured to effectuate a radiation power level control, said program instructions comprising:
a code portion for determining that a tunable action is required with respect to at least one of a plurality of tunable elements of said wireless UE device;
a code portion for defining one or more tunable element settings;
a code portion for determining a Specific Absorption Rate (SAR) value based on said defined tunable element settings; and
a code portion for performing an iterative SAR determination comprising:
determining whether said SAR value is within a first acceptable limit; if so, generating one or more tuning control signals to configure said one or more tunable elements according to said defined tunable element settings; and if not, redefining said one or more tunable element settings, re-determining said SAR value, and re-performing the iterative SAR determination until said SAR is within said first acceptable limit.

29. The non-transitory computer readable medium of claim 28 wherein said code portion configured for determining said SAR value is further configured to compute said SAR value by executing a mathematical formula.

30. The non-transitory computer readable medium of claim 28 wherein said code portion configured for determining said SAR value is further configured to query a lookup table for determination of said SAR value.

31. The non-transitory computer readable medium of claim 28 further comprising a code portion configured to adjust a transmission power level of said wireless UE device based on said settings of said configured tunable elements.

32. The non-transitory computer readable medium of claim 28 further comprising:
a code portion for setting an extrapolation time window (T);
a code portion, responsive to determining that said SAR value is within said first acceptable limit, or extrapolating said SAR value over said extrapolation time window to obtain an extrapolated SAR value; and
a code portion for determining that said extrapolated SAR value is within a second acceptable limit.

33. The non-transitory computer readable medium of claim 32 further comprising a code portion, responsive to determining that said extrapolated SAR value is not within said second acceptable limit, configured to iteratively redefine said one or more tunable element settings, vary said extrapolation time window, or both, and re-determine said SAR value and re-extrapolate said SAR value until said re-extrapolated SAR value is within said second acceptable limit.

34. The non-transitory computer readable medium of claim 28 wherein said code portion for determining that a tunable action is required with respect to at least one of a plurality of tunable elements of said wireless UE device is operable responsive to detecting one or more changes with respect to at least one operational parameter associated with said wireless UE device.

* * * * *